US011669600B2

(12) United States Patent
Li et al.

(10) Patent No.: US 11,669,600 B2
(45) Date of Patent: Jun. 6, 2023

(54) CONTROLLING A USE OF SHARED DEMO ASSETS USING A DIGITAL WATERMARK

(71) Applicant: INTERNATIONAL BUSINESS MACHINES CORPORATION, Armonk, NY (US)

(72) Inventors: Jenny S. Li, Cary, NC (US); Barbara L. Linden, Darien, CT (US); Robert Baz, Dubai (AE); Mona Arishi, Dubai (AE)

(73) Assignee: International Business Machines Comporation, Armonk, NY (US)

( * ) Notice: Subject to any disclaimer, the term of this patent is extended or adjusted under 35 U.S.C. 154(b) by 152 days.

(21) Appl. No.: 16/424,589

(22) Filed: May 29, 2019

(65) Prior Publication Data
US 2020/0380097 A1  Dec. 3, 2020

(51) Int. Cl.
*G06F 21/16* (2013.01)
*G06F 21/10* (2013.01)
*G06Q 10/10* (2023.01)
*G06Q 10/101* (2023.01)

(52) U.S. Cl.
CPC ............ *G06F 21/16* (2013.01); *G06F 21/105* (2013.01); *G06Q 10/101* (2013.01)

(58) Field of Classification Search
None
See application file for complete search history.

(56) References Cited

U.S. PATENT DOCUMENTS

| | | | |
|---|---|---|---|
| 5,629,980 A | * | 5/1997 | Stefik ...................... G06F 21/10 705/54 |
| 6,807,534 B1 | * | 10/2004 | Erickson ............... H04L 63/126 713/153 |
| 7,003,731 B1 | | 2/2006 | Rhoads et al. |
| 7,051,208 B2 | | 5/2006 | Venkatesan et al. |
| 7,802,306 B1 | * | 9/2010 | Adams ............. G11B 20/00144 726/26 |
| 7,822,969 B2 | | 10/2010 | Anglin |
| 7,978,874 B2 | | 7/2011 | Levy |
| 8,024,571 B2 | | 9/2011 | Round |

(Continued)

FOREIGN PATENT DOCUMENTS

| | | | |
|---|---|---|---|
| CN | 102831570 B | 8/2014 | |
| WO | WO-2013139398 A1 | * 9/2013 | ............ G06F 21/10 |

OTHER PUBLICATIONS

Chroni, M. et al., "A watermarking System for Teaching Intellectual Property Rights: Implementation and Performance", 2012 IEEE. (Year: 2012).*

(Continued)

*Primary Examiner* — Neha Patel
*Assistant Examiner* — Clay C Lee
(74) *Attorney, Agent, or Firm* — Schmeiser, Olsen & Watts, LLP; Aaron Pontikos

(57) ABSTRACT

A system and method for controlling usage of shared demo assets includes embedding a digital watermark into a demo asset created by a first entity, the digital watermark including usage conditions defined by the first entity, tracking a use of the demo asset by a second entity by utilizing the digital watermark embedded into the demo asset, and controlling, by the processor, the use of the demo asset by the second entity based on a compliance with the usage conditions defined by the first entity.

14 Claims, 11 Drawing Sheets

(56) References Cited

U.S. PATENT DOCUMENTS

| | | |
|---|---|---|
| 8,565,472 B2 | 10/2013 | Rzeszewski et al. |
| 9,323,902 B2 | 4/2016 | Petrovic et al. |
| 9,665,723 B2 | 5/2017 | Dabbiere et al. |
| 9,965,600 B2 | 5/2018 | Curzi et al. |
| 10,236,006 B1* | 3/2019 | Gurijala ................ G10L 19/02 |
| 10,417,587 B2* | 9/2019 | Wall ................ G06Q 10/0633 |
| 2003/0026421 A1 | 2/2003 | Morlet |
| 2005/0144458 A1 | 6/2005 | Venkatesan et al. |
| 2005/0249374 A1 | 11/2005 | Levy |
| 2006/0089912 A1* | 4/2006 | Spagna ................ H04W 4/02 705/51 |
| 2006/0212705 A1* | 9/2006 | Thommana ........... G06T 1/0021 713/176 |
| 2008/0155698 A1 | 6/2008 | Round |
| 2009/0110231 A1 | 4/2009 | Rzeszewski et al. |
| 2011/0314550 A1 | 12/2011 | Mastrangelo et al. |
| 2013/0114847 A1* | 5/2013 | Petrovic ................ G06K 9/6206 382/100 |
| 2013/0151856 A1 | 6/2013 | Petrovic et al. |
| 2013/0332989 A1 | 12/2013 | Dabbiere et al. |
| 2014/0229865 A1* | 8/2014 | Da Costa ............ G06F 3/04815 715/757 |
| 2015/0016661 A1 | 1/2015 | Lord |
| 2017/0017779 A1* | 1/2017 | Huang ................ G06F 21/16 |
| 2017/0053105 A1 | 2/2017 | Curzi et al. |
| 2017/0286646 A1 | 10/2017 | Duggal et al. |
| 2017/0344540 A1* | 11/2017 | Pidduck ................ G06F 16/93 |
| 2019/0278459 A1* | 9/2019 | da Costa .............. G06Q 10/101 |

OTHER PUBLICATIONS

Well, Peter et al.; "The NIST Definition of Cloud Computing;" National Institute of Standards and Technology; Special Publication 800-145; Sep. 2011; 7 pages.

Zhang et al., Written by: IBM Research Editorial Staff, Jul. 20, 2018, Protecting the Intellectual Property of AI with Watermarking, https://www.ibm.com/blogs/research/2018/07/ai-watermarking/, 6 pages.

* cited by examiner

CONTROLLING A USE OF SHARED DEMO ASSETS USING A DIGITAL WATERMARK

TECHNICAL FIELD

The present invention relates to systems and methods for controlling user of shared demo assets, and more specifically the embodiments of a usage control system for controlling usage of shared demo assets.

BACKGROUND

Collaborations among different teams in a large enterprise developing demo assets can be challenging especially when teams are administered using a cost recovery model.

SUMMARY

An embodiment of the present invention relates to a method, and associated computer system and computer program product for controlling usage of shared demo assets. A processor of a computing system embeds a digital watermark into a demo asset created by a first entity, the digital watermark including usage conditions defined by the first entity. A use of the demo asset by a second entity is tracked by utilizing the digital watermark embedded into the demo asset. The use of the demo asset by the second entity is controlled based on a compliance with the usage conditions defined by the first entity.

DETAILED DESCRIPTION

Embodiments of the present invention enable an asset creator to put a digital signature on the asset to protect the asset creator's ownership and also define conditions of sharing and usage to exercise control of the asset. In exemplary embodiments, the asset is a demo asset, which is different from other types of stationary assets, such as files, pictures or videos. A demo asset is a configuration of hardware and/or software for a number of use cases. The demo asset can be front end user interfaces, such as a dashboard, a webpage, or an application front end. The demo asset can also be a backend application to handle business logic or acquire services. Optionally, the demo asset can comprise a database to store data. Demo assets are similar to a small scale web/mobile application; however, unlike a conventional website, a demo asset does not need domain name registration which makes it a challenge for the creator/owner (i.e. a person or a team) to declare ownership of the asset. By way of example, a creator/owner, such as "Team A" creates a demo asset which other teams within a same enterprise may showcase to clients. Another team, such as "Team B" may need help for one of Team B's client opportunities and as such decides to use the demo asset created by Team A. If Team B shows Team A's demo to a customer and closes the deal, Team A may not know that Team A's demo asset has contributed to closing the deal. Further, Team A has no idea whether Team B has modified Team A's demo or not. If Team B modifies Team A's demo, the ownership of the modified demo asset is debatable and whether Team A should get any credit. Team A also has no idea whether Team B shared Team A's demo with other teams. Accordingly, challenges exist with the collaboration among two or more teams regarding ownership of demo assets.

Figure 1:
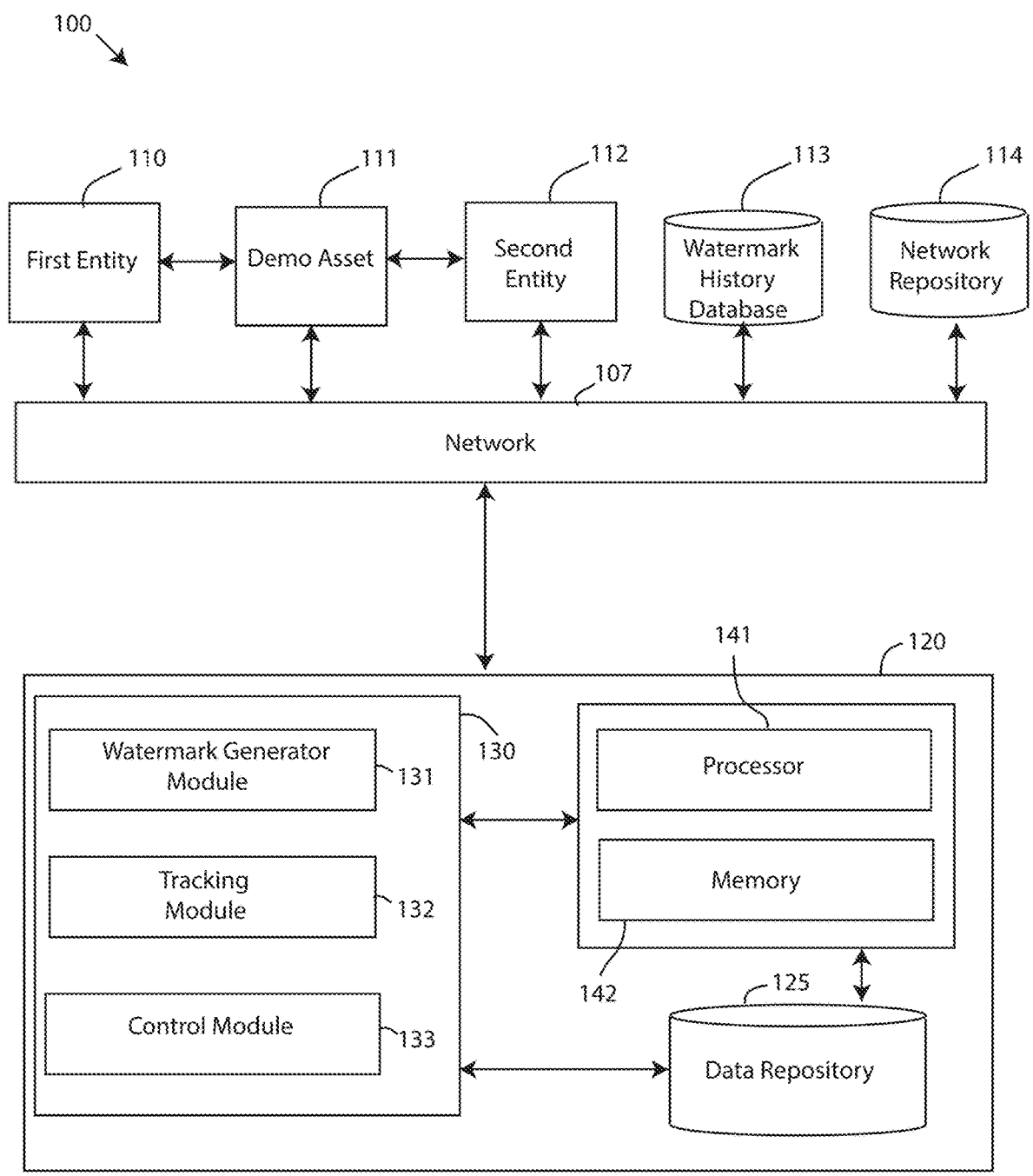
FIG. 1 depicts a block diagram of usage control system, in accordance with embodiments of the present invention.

Referring to the drawings, FIG. 1 depicts a block diagram of usage control system 100, in accordance with embodiments of the present invention. The usage control system 100 is a system for tracking and controlling usage of shared demo assets. Demo assets may be shared between teams in the same enterprise, such as large company or network. The usage control system 100 may be useful for controlling the usage of a demo asset 111 created by a first entity 110 that is shared with a second entity 112. The usage control system 100 enables the first entity 110 (e.g. asset owner) to place a "signature" on the demo asset 111 that includes terms and conditions (e.g. "usage conditions") that dictate how the demo asset 111 can be used by other teams, such as the second entity 112. The "signature" is a digital signature on the demo asset 111. In an exemplary embodiment, the digital signature is a non-erasable watermark as meta data embedded in every component of the demo asset 111. For instance, the first entity 110 can create a watermark that is visible in every user interface of the demo asset 111, such as a web page, and also in each backend component. The watermark includes the usage conditions as defined by the first entity 110, and is optionally encrypted to prevent unauthorized modifications to the watermark. In some embodiments, the watermark is stored on a blockchain database to take advantage of the immutable characteristics of the blockchain database.

Further, the usage control system 100 controls the use of the demo asset 111 by monitoring the demo asset 111 and detecting if any modifications are made to the demo asset 111 by the second entity 112. If the demo asset 111 is modified by the second entity 112, the usage control system 100 can disable the functioning of the demo asset 111 if there is a breach of the usage conditions; the usage control system 100 can also disable the demo asset 111 if the watermark is not valid or has been altered. If the detected modification is allowed by the usage conditions, the ownership of the demo asset 111 may be altered along with the usage conditions, resulting in a generation of a new watermark.

Embodiments of the usage control system 100 may be alternatively referred to as a demo asset tracking system, an asset control system, a collaboration tool for shared demo assets within an enterprise, an ownership tracking system, and the like. The usage control system 100 includes a computing system 120. Embodiments of the computing system 120 include a computer system, a computer, a server, one or more servers, a backend computing system, and the like.

Referring still to FIG. 1, the usage control system 100 includes a first entity 110, a demo asset 111, a second entity 112, and a watermark history database 113 that are communicatively coupled to the computing system 120 over a network 107. For instance, information/data is transmitted to and/or received from the first entity 110, the demo asset 111, the second entity 112, and the watermark history database 113 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In an exemplary embodiment, the network 107 further comprises, in addition to the computing system 120, a connection to one or more network-accessible knowledge bases 114, which are network repositories containing information of the first entity, the second entity, usage conditions, usage conditions preferences, recorded violations of the usage conditions, created watermark transactions, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the first entity, the second entity, usage conditions, usage conditions preferences, recorded violations of the usage conditions, created watermark transactions, etc., and the like, to generate both historical and predictive reports regarding a usage of the demo asset throughout an enterprise. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The first entity 110 is a team, person, group, collaborator, etc. that has created or otherwise authored a demo asset 111. The first entity 110 communicates with the computing system 120 using one or more user computing devices. The second entity 112 is a team, person, group, collaborator, etc. that uses or desires to use the demo asset 111 created by the first entity 110. While the second entity 112 is described herein as a second team that uses the demo asset 111 created by the first entity 110, it should be understood that the second entity 112 includes additional teams, users, individuals, etc. that desire to use and/or modify the demo asset 110 originally created by the first entity 110. The second entity 112 communicates with the computing system 120 using one or more user computing devices. The first entity 110 and the second entity 112 are part of the same enterprise (e.g. company) and have access to demo assets created by teams within the enterprise. Alternatively, the first entity 110 and the second entity 112 are not part of the same enterprise.

The watermark history database 113 is a database, storage medium, blockchain database, and the like, that stores each watermark and the contents of the watermarks created or otherwise embedded into the demo asset 111 by the computing system 120. The watermark history database 113 provides a cognitive storage ability for the history of the usage conditions, agreements between the first entity 110 and the second entity 112, watermark generation history and transactions, etc.

The computing system 120 of the usage control system 100 is equipped with a memory device 142 which stores various data/information/code, and a processor 141 for implementing the tasks associated with the usage control system 100. A usage control application 130 is loaded in the memory device 142 of the computing system 120. The usage control application 130 can be an interface, an application, a program, a module, or a combination of modules. In an exemplary embodiment, the usage control application 130 is a software application running on one or more back end servers (e.g. computing system 120). In other embodiments, the usage control application 130 is a software application running on the computing devices associated with the first entity 10, the second entity 112, and other entities that have access to the demo asset 111.

The usage control application 130 of the computing system 120 includes a watermark generator module 131, a tracking module 132, and a control module 133. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The watermark generator module 131 includes one or more components of hardware and/or software program code for embedding a digital watermark into the demo asset 110 created by the first entity 110. The watermark generator module 131 utilizes a watermark generator tool to generate the digital watermark that is embedded into the demo asset 111. The watermark generator tool contains an algorithm that triggers the initiation of the digital watermark to be embedded into the demo asset 111 created by the first entity 110. The digital watermark contains covertly embedded authentication information (codes) or algorithms that facilitates owner identification and correlates with and controls other content. For example, the watermark contains asset substance parameters, contract terms and conditions, asset usage limitations and rules, conditions for modification of the demo asset 111, and rules governing when alerts or warnings of a potential breach or violation of the usage conditions is transmitted to the first entity 110. Further, the digital watermark includes basic information such as owner's information, code information (e.g. release date, version, code size, etc.), embedded contract/terms and conditions of sharing and usage ("usage conditions"), code to monitor and enforce the user's usage of the demo asset, and code to automatically generate a new watermark if the demo asset is being modified in the case when the terms and conditions allow for such modification.

The usage conditions contained in the watermark include a period of usage, an authorized user requirement, editing capabilities, added functionalities of the demo asset, and the like. For example, the usage conditions set forth rules that govern: how long the demo asset 111 can be used by the second entity 112, whether a particular entity or user is authorized to access the demo asset 111 (e.g. a user that is not an employee of a company can be prevented from using the demo asset), whether the second entity 112 can edit the demo asset 111 or only has the ability to run the demo asset 111, whether the second entity can add or remove a functionality to the demo asset 111, and the like. The usage conditions also set forth rules that govern types of the modification that are allowed to be made to the demo asset 111 by the second entity 112. For instance, the usage conditions may allow the second entity 112 to make certain types of modifications that do not violate the usage conditions. By way of example, the usage conditions set forth by the first entity 110 can allow the second entity to change the "look and feel" of a user interface contained within the demo asset 110 because this type of modification does not materially change the function or purpose of the demo asset 110. However, the usage conditions may not allow changes to the demo asset 111 that materially change the function or purpose of the demo asset, such as adding or removing a particular function of the demo asset 110. Still further, the usage conditions, if needed, can include a condition to allow the second entity 112 to have editing rights to amend, enhance, improve, etc. the demo asset 111. If the usage conditions allow the demo asset 110 to be amended by the second entity 112, then the ownership and terms and conditions are effectively changed; a new watermark is generated to capture the new ownership and amended usage conditions, which automatically replaces the previous watermark.

The usage conditions are defined by the first entity 110, and may be unilaterally defined by the first entity or may be a reflection of an oral or written agreement with the second entity. In a first embodiment, the usage conditions are input by the first entity 110 using a user interface. The first entity 110 can interact with a user interface of the usage control application 130 running on the user computing device to enter or otherwise select various preloaded rules, limitations, conditions and terms for controlling the usage of the demo asset 111. In a second embodiment, the usage conditions are automatically input by the usage control application 130 that uses a learning algorithm that learns preferences of the first entity 110 over time. The learning algorithm may also analyze a frequency that the demo asset 111 is used by other entities. If the demo asset 111 is a successful and often used demo asset 111, the learning algorithm may generate stricter usage conditions that allow for less modification by other entities borrowing the demo asset 111. Other factors can contribute to the automatic generation of the usage conditions, such as the number of other teams within the enterprise. If an enterprise has only a few teams all located in the same physical office, the usage conditions can be less strict because the teams can more effectively monitor the borrowing teams' amendments. If an enterprise has thousands of teams located all over the world, then the usage conditions will be automatically generated to allow for less modification and more control over the usage.

The watermark generator module 131 embeds the watermark into the demo asset 110 such that without the watermark, the demo asset cannot be run. In exemplary embodiments, the watermark is visible (e.g. one or more clickable graphical icons on a user interface of the demo asset) and can be viewed on every URI, or component of the demo asset 111.

With continued reference to FIG. 1, the computing system 120 includes a tracking module 132. The tracking module 132 includes one or more components of hardware and/or software program code for tracking a use of the demo asset 111 by the second entity 112 by utilizing the digital watermark embedded into the demo asset 111. The usage of the demo asset 111 by the second entity 112 triggers a tracking and/or monitoring function performed by the tracking module 132. The tracking module 132 tracks/monitors the usage of the demo asset by the second entity 112. The tracking module 132 includes usage monitoring code that implements an algorithm that enables the tracking of demo assets over a specified period of time given the usage conditions. For instance, the tracking module 132 obtains and monitors information such as the identity of the recipients (i.e. ID of the second entity 112), dates of use of the demo asset 111 by the second entity 112, a duration of use of the demo asset 111 by the second entity 112, a location of the second entity 112, etc. Furthermore, the tracking module 132 monitors whether modification alerts, non-compliance alerts, or notifications have been sent to the first entity 110 based on the usage of the second entity 112. Accordingly, the tracking module 132 of the usage control application 130 continuously monitors the usage of the demo asset 111 by the second asset to detect whether a non-editing violation of the usage condition has occurred (e.g. unauthorized user attempts to access the demo asset) and/or whether a modification or change to the demo asset 111 has occurred as a result of the usage by the second entity 112.

If the tracking module 132 detects a modification to the demo asset 111 or a potential non-editing violation of the usage conditions, the usage control application 130 evaluates the modification under the terms and conditions and enforces the usage conditions set forth in the watermark. Specifically, the control module 133 of the usage control application 130 includes one or more components of hardware and/or software program code for controlling the use of the demo asset 111 by the second entity 112 based on a compliance with the usage conditions defined by the first entity 110. Controlling the use of the demo asset 110 includes disabling the demo asset 111 so that the second entity 112 can no longer use the demo asset 111, documenting ownership if allowed changed to the demo asset 111 are made by the second entity 112, warning the second entity 112 about a potential violation of the usage conditions, sending notifications to the first entity when changes are made or when a violation occurs, generating a new watermark that includes updates usage conditions for future uses of the demo asset 111 subsequent to the use by the second entity 112, and the like.

The particular action taken by the control module 133 to control the use of the demo asset 111 depends on the usage conditions set forth by the first entity 110. If a modification to the demo asset 111 by the second entity 112 is detected as a function of the tracking/monitoring, the control module 133 determines whether the modification to the demo asset is a violation of the usage conditions and not allowed, or if the modification is not a violation of the usage conditions and thus complies with the usage conditions. The control module 133 validates the watermark and applies the rules set forth by the usage conditions to first determine whether any modifications are allowed. If the usage conditions do not permit modifications of any degree, then the control module 133 concludes that the second entity has violated the usage conditions. In response, the control module 133 disables the demo asset 111 from being run or otherwise used by the second entity 112. The control module 133 optionally warns the second entity 112 that the proposed change is not allowed, and if the modification is not withdrawn, the demo asset 111 will be disabled, preventing the second entity 112 from using the demo asset 111.

If the usage conditions permit some ypes of modifications, then the control module 133 analyzes the modification to determine whether the type of modification detected as a function of the tracking violates the usage condition or complies with the usage condition. The control module 133 consults the usage conditions, which, for example, allow changes to color schemes, but does not allow removal of a search function at a top of the user interface. In this example, if the proposed modification by the second entity 112 seeks to replace the search function with a different function, then the control module 133 concludes that the detected modification violates the usage conditions set forth by the first entity 110. In response, the control module 133 disables the demo asset 111 from being run or otherwise used by the second entity 112. The control module 133 optionally warns the second entity 112 that the proposed change is not allowed, and if the modification is not withdrawn, the demo asset 111 will be disabled, preventing the second entity 112 from using the demo asset 111.

Using the same example, if the proposed modification by the second entity 112 seeks to change the primary color of the header from green to blue (e.g. to match the color of the potential client's trademark), then the control module 133 concludes that the detected modification complies with the usage conditions set forth by the first entity 110 and is allowed. In response, the control module 133 creates a new watermark to be embedded into the demo asset because the demo asset has been changed. The new watermark replaces the previous watermark embedded into the demo asset, and documents the modification made by the second entity and updates the ownership data so that the ownership of the modification is attributed to the second entity 112. The control module 133 saves the transaction of the newly created watermark to the watermark history database 113.

Moreover, the control module 133 notifies the first entity 110 of any proposed modification by the second entity 112, warning sent to the second entity 112, newly created watermark, and the like. The notification allows for the first entity 110 to exercise more control of the demo asset 110, such as actively taking steps outside of the usage control application 130 to retain ownership and control of the demo asset.

Figure 2:
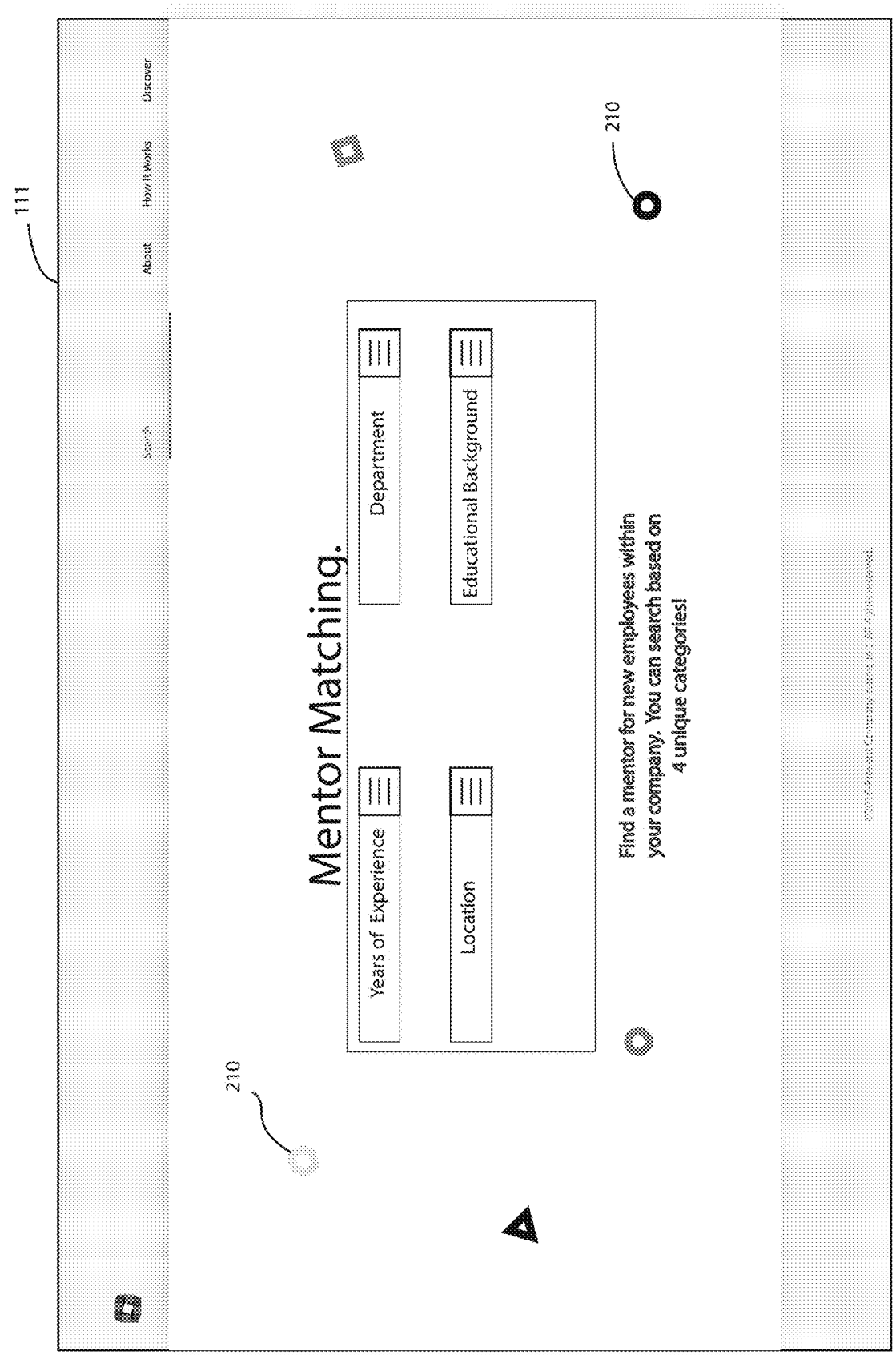
FIG. 2 depicts a demo asset as created by a first entity, in accordance with embodiments of the present invention.

FIGS. 2-6 provide an exemplary example of the application of the usage control application. FIG. 2 depicts a demo asset 111 as created by the first entity 110, in accordance with embodiments of the present invention. The demo asset ill is a front end user interface that allows a new employee to find a mentor within the company, or a human resources department to find and match a new employee with a mentor within the company. The demo asset 111 includes a search function that allows the user to input information related to four separate categories, including years of experience, location, department, and educational background. The arrangement of this page of the demo asset 111 includes a light gray header and footer. At least two watermarks 210 are visible on this page of the demo asset 111. The watermarks 210 are represented by shapes in this example, but could be represented by text or other logos. The watermarks 210 are embedded into the demo asset 111 and contain code defining the usage conditions set forth by the first entity 110. In this example, the user has defined usage conditions that allow modifications to the demo asset 111 that are aesthetic, but do not allow modifications that add additional search categories or remove existing search categories. The demo asset 111 is available for other teams within the enterprise to use.

Figure 3:
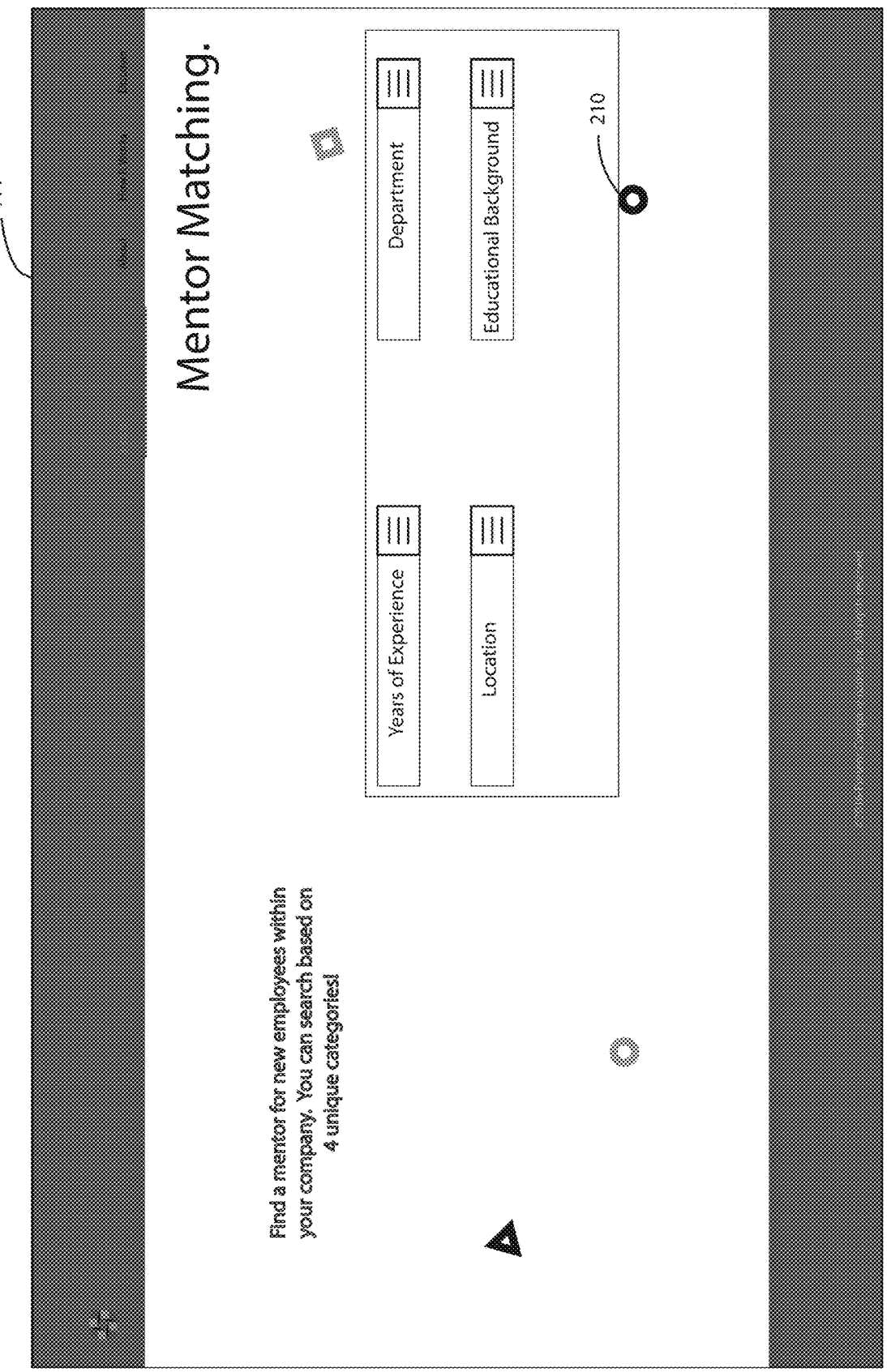
FIG. 3 depicts a demo asset that has been modified by a second entity, in accordance with embodiments of the invention.
Figure 4:
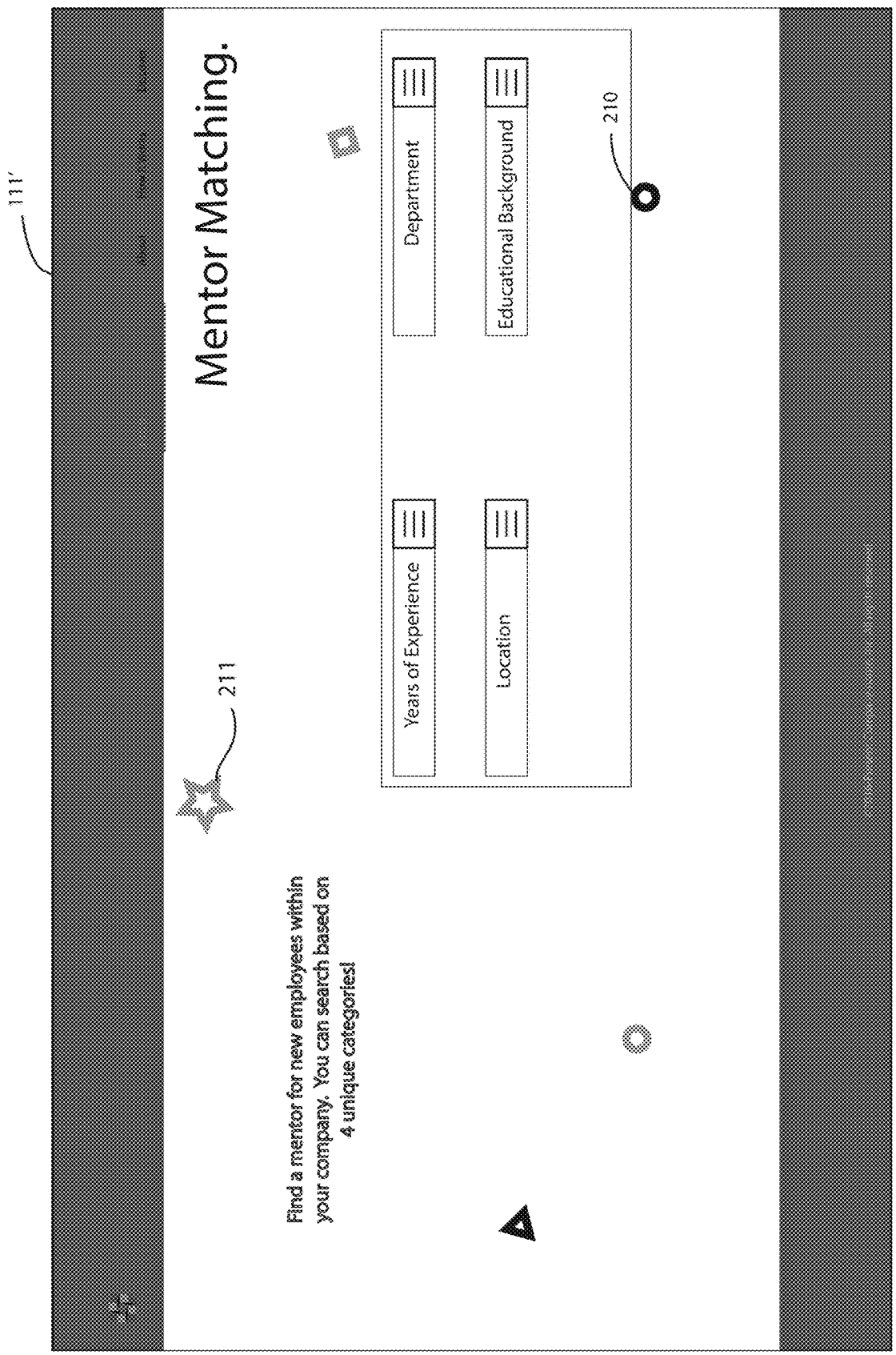
FIG. 4 depicts the demo asset of FIG. 3, with an addition of a new watermark 11 created as a result of the modification to the original demo asset, in accordance with embodiments of the present invention.

FIG. 3 depicts a demo asset 111' that has been modified by the second entity 112, in accordance with embodiments of the invention. The demo asset 111' has been modified to change the color of the header and footer to a dark gray, as well as relocate the text on the webpage to locations that are different than the original demo asset 111. The usage control application 130 determines that the modifications comply with the usage conditions set forth by the first entity 110 because the changes are aesthetic changes only. FIG. 4 depicts the demo asset 111' of FIG. 3, with an addition of a new watermark 211 created as a result of the modification to the original demo asset 110, in accordance with embodiments of the present invention. The new watermark 211 is generated and embedded into the demo asset 111' to document the aesthetic change made by the second entity 112 and to track ownership of the aesthetic change. The first entity is 110 is notified of the change and the creation of the new watermark, and the transaction is stored on the watermark history database 113, and the second entity 112 can continue to run the demo asset 111'. Accordingly, control of the usage of the demo asset 111 is controlled and ownership is properly documented.

Figure 5:
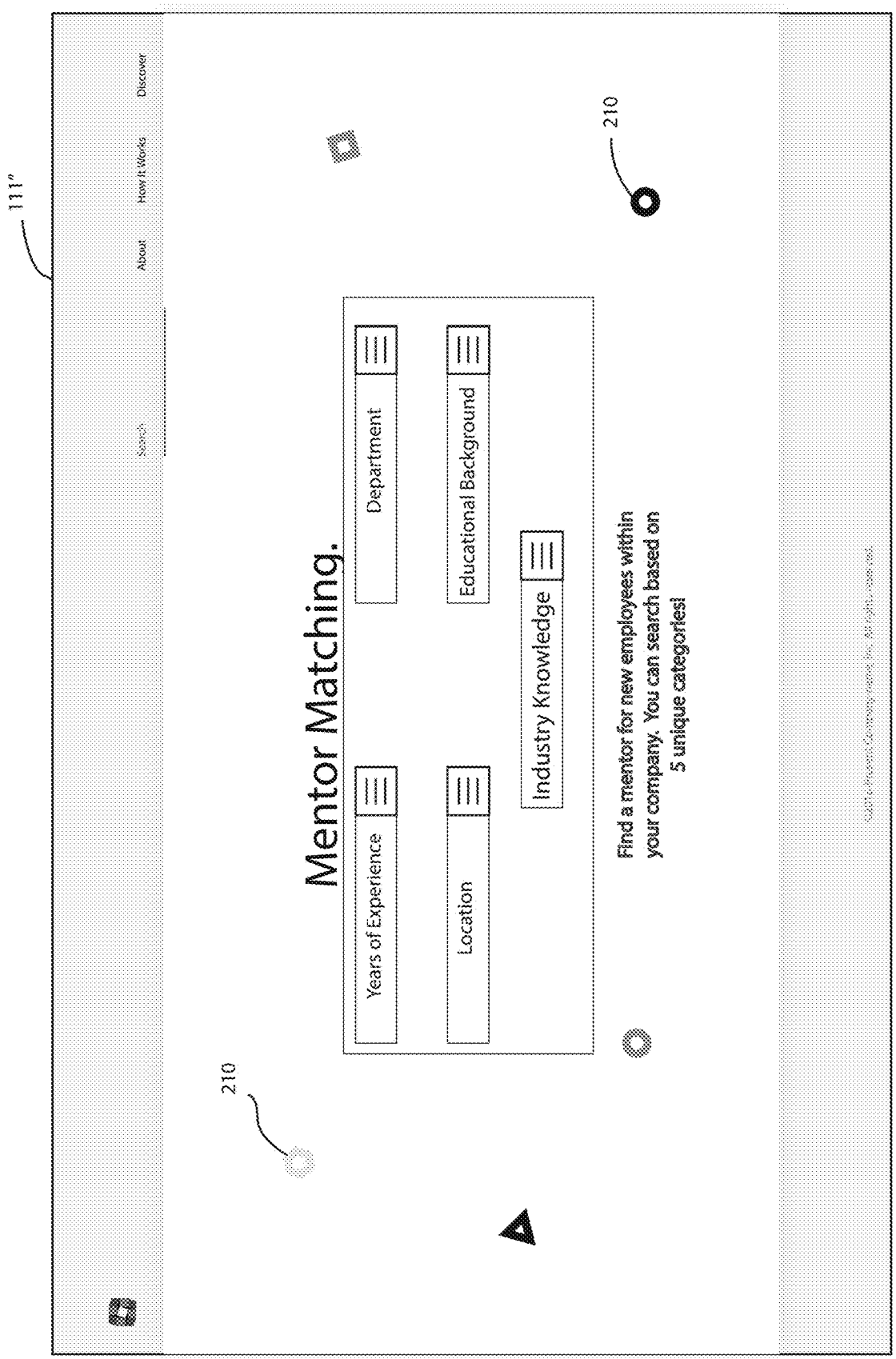
FIG. 5 depicts a demo asset that has been modified by the second entity in a different manner than in FIG. 3, in accordance with embodiments of the invention.
Figure 6:
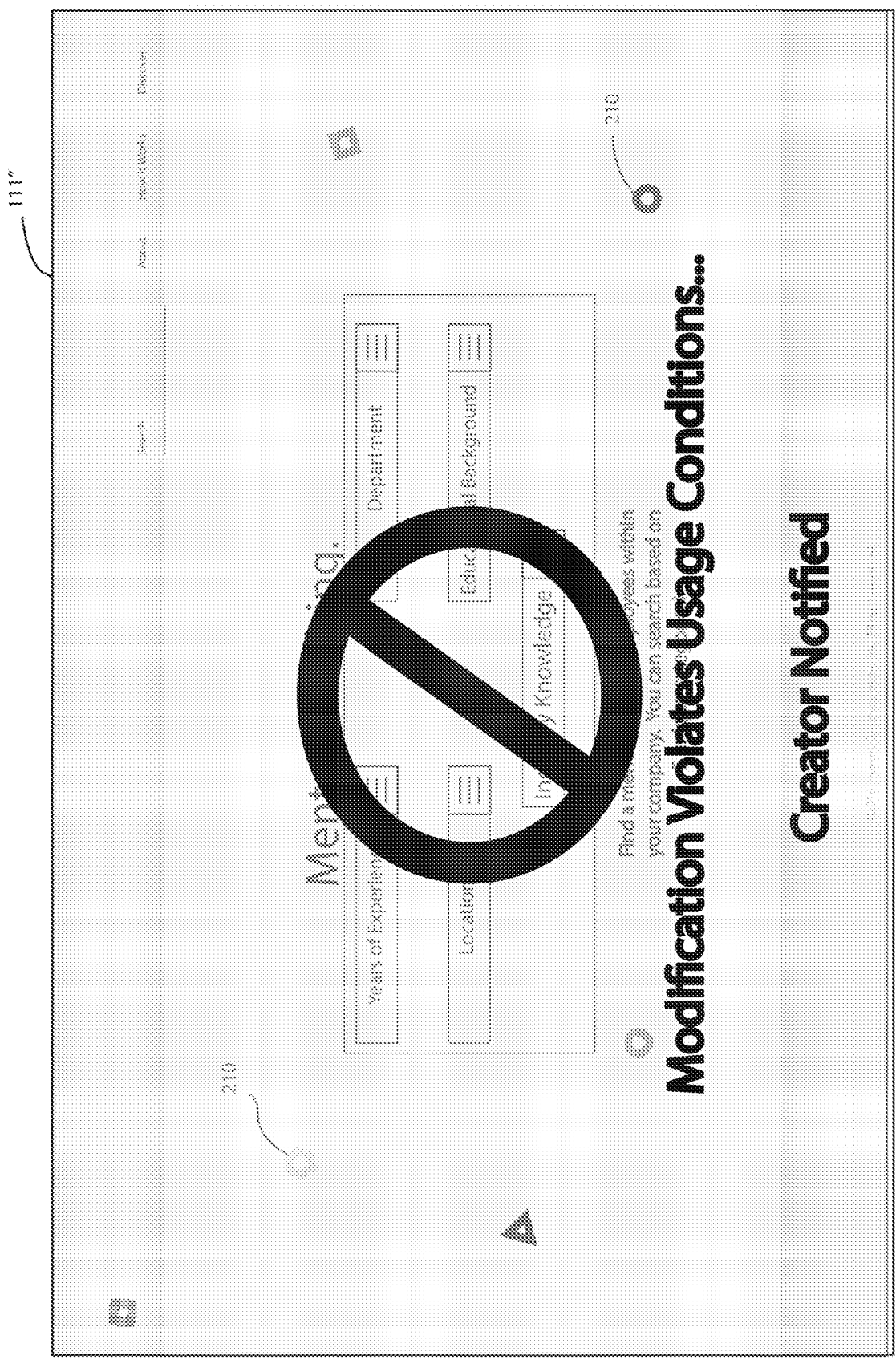
FIG. 6 depicts the disabling of the demo asset of FIG. 5 as a result of a violation of the usage conditions, in accordance with embodiments of the present invention.

FIG. 5 depicts a demo asset 111" that has been modified by the second entity 112 in a different manner than in FIG. 3, in accordance with embodiments of the invention. The demo asset 111" has been modified to add a new search category of industry knowledge, which is not present in the original demo asset 111. The usage control application 130 determines that the modification of adding the new search category violates the usage conditions set forth by the first entity 110 because the second entity 112 added a new search category. FIG. 6 depicts the disabling of the demo asset 111" of FIG. 5 as a result of a violation of the usage conditions, in accordance with embodiments of the present invention. The demo asset 111" is disabled so that the second entity 112 cannot continue to use the demo asset created by the first entity 110. The first entity is 110 is notified of the violation by the second entity 112, the transaction is stored on the watermark history database 113, and the second entity 112 cannot continue to run the demo asset 111'. Accordingly, the usage of the demo asset 111 by another team is controlled.

Various tasks and specific functions of the modules of the computing system 120 may be performed by additional modules, or may be combined into other module(s) to reduce the number of modules. Further, an embodiment of the computer or computersystem 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components specialized integrated circuit, such as for example an Application Specific Integrated Circuit (ASIC), designed for only implementing methods of the present invention).

Furthermore, the usage control system 100 applies a specific set of rules that are uniquely applied to each detected modification. The usage control system 100 provides a technical solution by disabling and/or generating new watermarks to exercise control of demo assets and document ownership information across multiple iterations of the demo asset.

Figure 7:
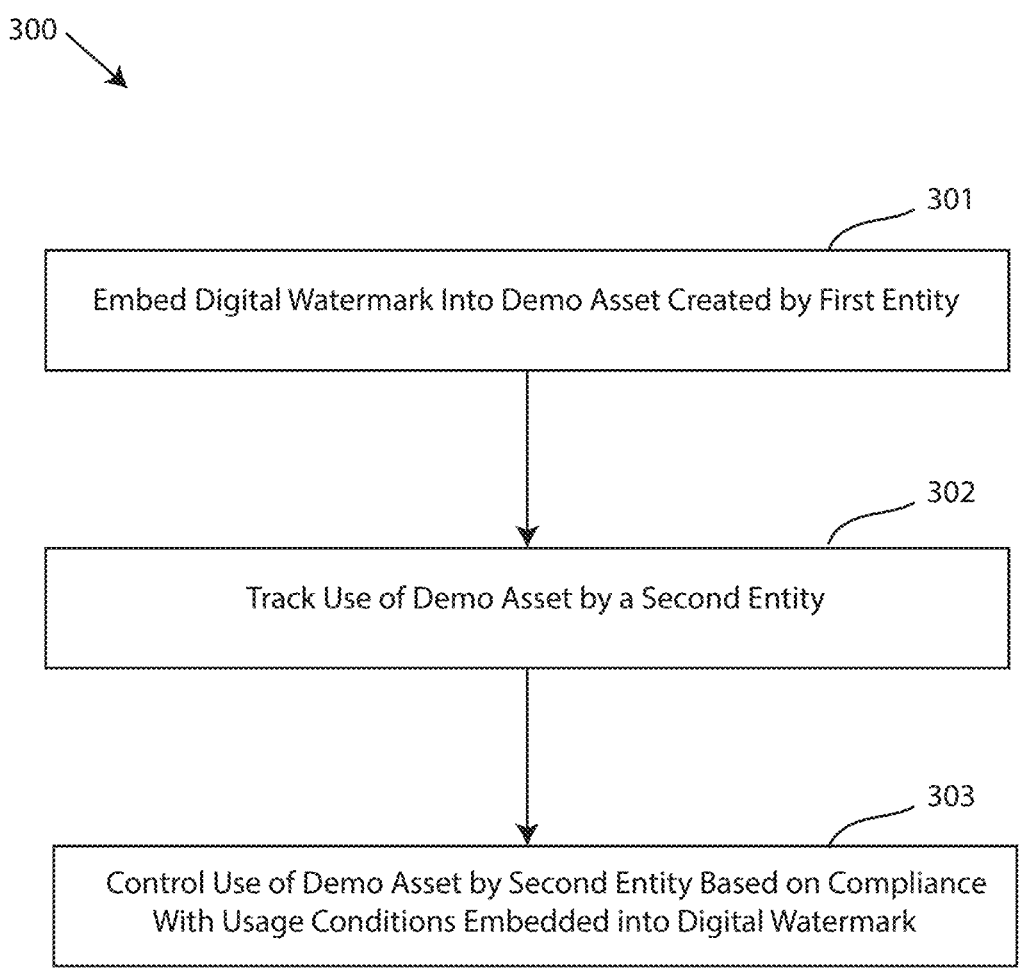
FIG. 7 depicts a flow chart of a method for controlling usage of shared demo assets, in accordance with embodiments of the present invention.

Referring now to FIG. 7, which depicts a flow chart of a method 300 for controlling usage of shared demo assets, in accordance with embodiments of the present invention. One embodiment of a method 300 or algorithm that may be implemented for usage control of shared demo assets with the usage control system 100 described in FIGS. 1-6 using one or more computer systems as defined generically in FIG. 9 below, and more specifically by the specific embodiments of FIG. 1.

Embodiments of the method 300 for controlling usage of shared demo assets, in accordance with embodiments of the present invention, may begin at step 301 wherein step 301 embeds a digital watermark into the demo asset created by the first entity. The watermark embedded into the demo asset includes terms and conditions that govern the use of the demo asset as the demo asset is shared to other teams. Step 302 tracks the use of the demo asset by a second entity, and other entities that access the demo asset. Step 303 controls the use of the demo asset based on a compliance of the terms and conditions embedded into the watermark and present on the demo asset.

Figure 8:
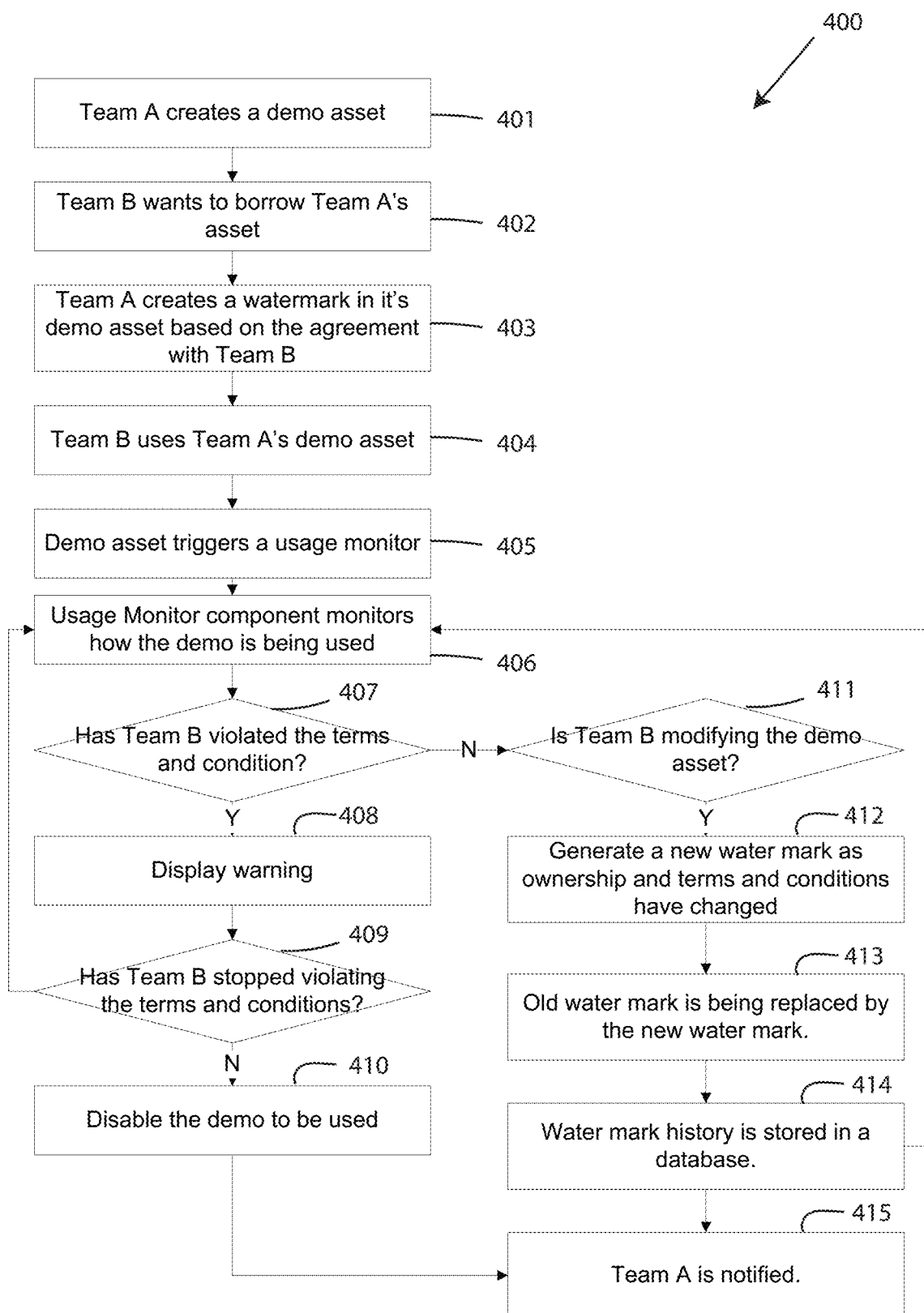
FIG. 8 depicts a detailed flow chart for controlling usage of shared demo assets, in accordance with embodiments of the present invention.

FIG. 8 depicts a detailed flow chart of a method 400 for controlling usage of shared demo assets, in accordance with embodiments of the present invention. At step 401, a first entity ("Team A") creates a demo asset. At step 402, a second entity ("Team B") wants to borrow Team A's demo asset. At step 403, a watermark is created that includes usage conditions that govern the use of the demo asset by Team B, which may have been previously discussed between Team A and Team B. Team B begins to use the demo asset at step 404. Step 405 triggers or otherwise commences monitoring and tracking Team B's use of the demo asset, and at step 406, the use is continuously tracked until a detection of a modification is made. If a modification is detected, step 407 determines whether Team B has violated the terms and conditions contained in the watermark. If the modification violates the terms and conditions, then step 408 displays a warning to Team B that the proposed modification is a violation. Step 409 determines whether Team B has stopped violating the terms and conditions (i.e. has Team B removed the modification?). If yes, the method returns to step 406. If no, then step 410 disables the demo asset so that Team B can no longer run the demo asset, and the method jumps to step 415 wherein Team A is notified that Team B has violated the terms and conditions and the demo asset has been disabled.

If the output of step 407 is that the modification made by Team B does not violate the terms and conditions, step 411 determines whether Team B has modified the demo asset in a way that should be tracked and documented (e.g. a change to the color of a graphical icon). If yes, then step 412 generates a new watermark to document the ownership of the modification and the change to the terms and conditions. Step 413 replaces the previous watermark and embeds the new watermark into the demo asset. The watermark creation and replacement is stored in a database at step 414. Step 415 notifies Team A of the creation of the new watermark.

Figure 9:
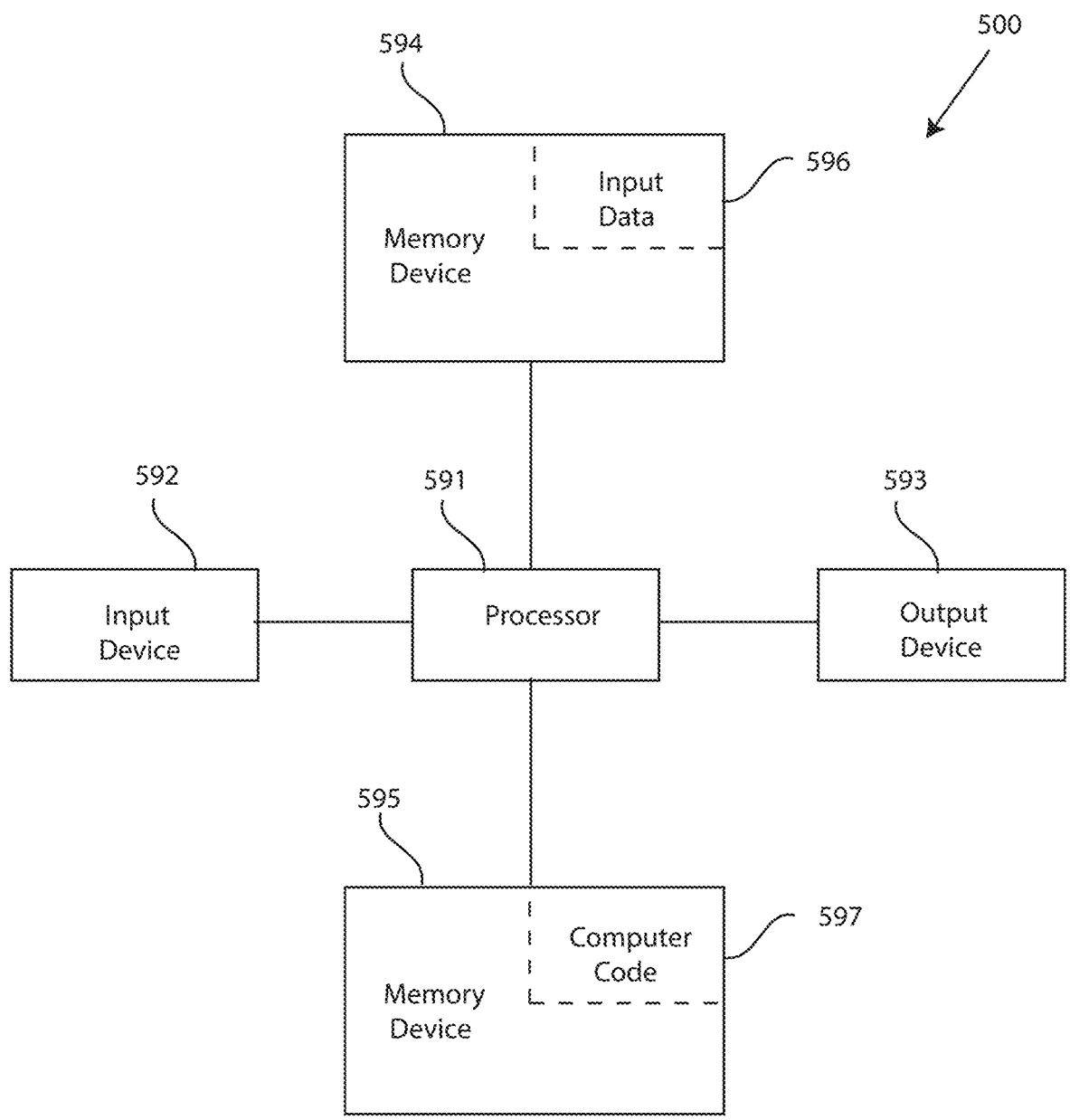
FIG. 9 depicts a block diagram of a computer system for a usage control system of FIGS. 1-6, capable of implementing a method for controlling usage of shared demo assets of FIGS. 7-8, in accordance with embodiments of the present invention.

FIG. 9 depicts a block diagram of a computer system for usage control system 100 of FIGS. 1-6, capable of implementing methods for controlling usage of shared demo assets of FIGS. 7-8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for controlling usage of shared demo assets in the manner prescribed by the embodiments of FIGS. 7-8 using the usage control system 100 of FIGS. 1-6, wherein the instructions of the computer code 597 may be executed by processor 591 via memory device 595. The computer code 597 may include software or program instructions that may implement one or more algorithms for implementing the method for controlling usage of shared demo assets, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system may further be coupled to an input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to controlling usage of shared demo assets. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to control usage of shared demo assets. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for controlling usage of shared demo assets. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for controlling usage of shared demo assets.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet n Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and co e program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
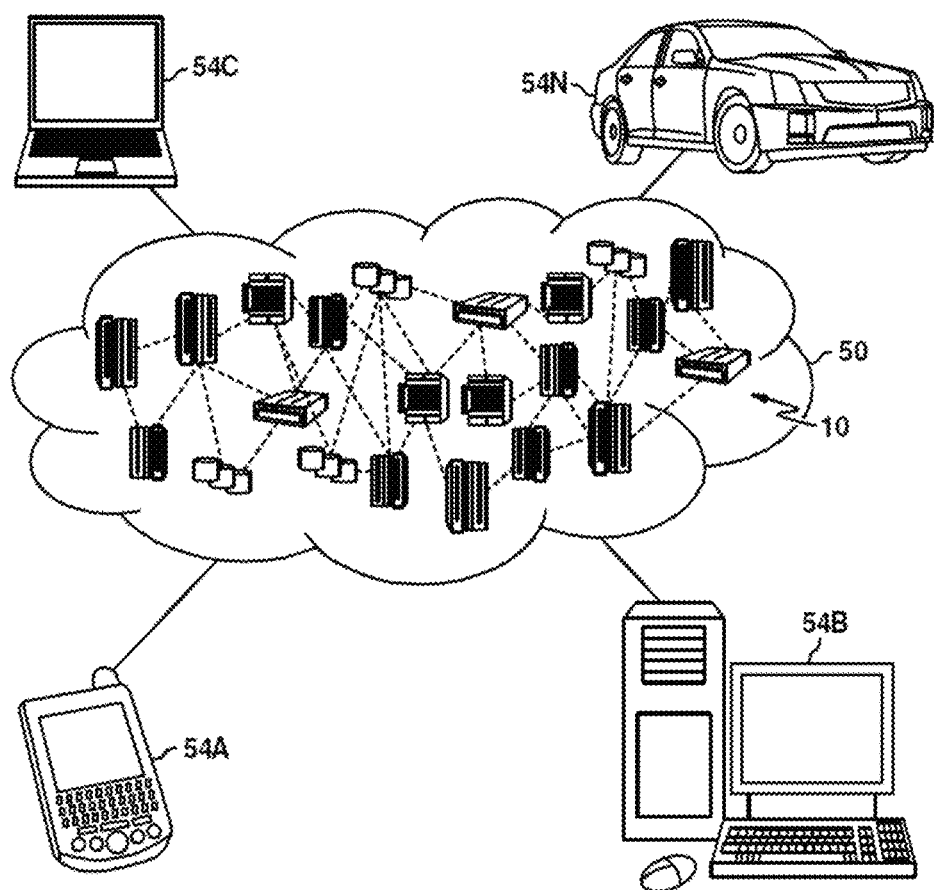
FIG. 10 depicts a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 11:
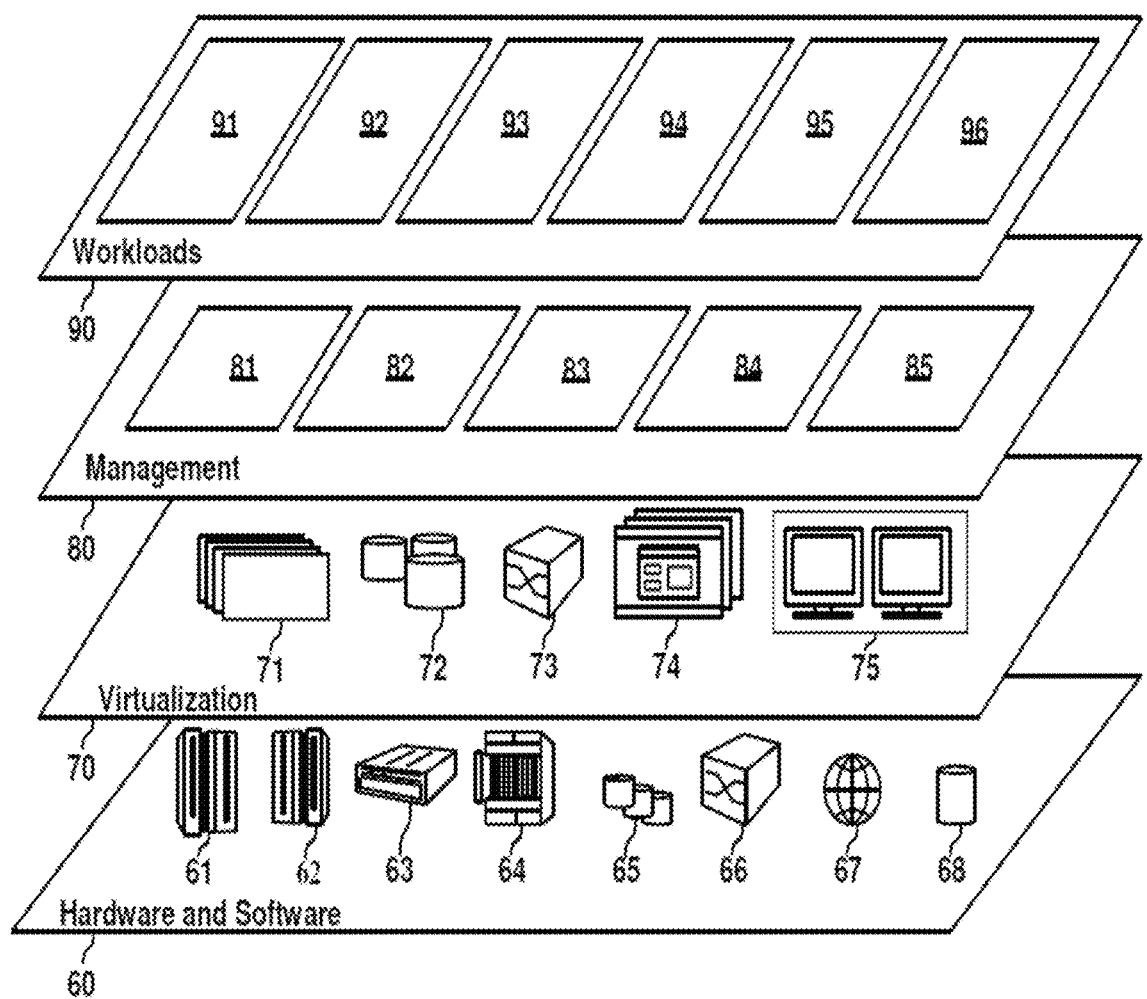
FIG. 11 depicts abstraction model layers, in accordance with embodiments of the present invention.

Referring now to FIG. 11, a set of functional abstraction layers provided by cloud computing environment 50 (see FIG. 10) are shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and usage of shared demo assets control 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for controlling usage of shared demo assets used within an enterprise, the method comprising:

embedding, by a processor of a computing system, a digital watermark into a demo asset created by a first entity of the enterprise, the digital watermark including first usage conditions automatically input by the processor using a learning algorithm that learns the preferences of the first entity over time, the first usage conditions governing multiple types of modifications that can be made to the demo asset by other entities of the enterprise;

generating, by processor, second usage conditions that are stricter than the first usage conditions that allow for less modifications by the other entities, based on the learning algorithm analyzing a frequency that the demo asset is borrowed by the other entities;

tracking, by the processor, modifications to the demo asset by a second entity by utilizing the digital watermark embedded into the demo asset; and controlling, by the processor, the modifications to the demo asset by the second entity based on a compliance with the stricter usage conditions updated by the learning algorithm, wherein the controlling includes:

determining, by the processor, that a modification to a content of the demo asset by the second entity is allowed under the stricter usage conditions, and creating, by the processor, a new watermark to be embedded into the demo asset that replaces a previous watermark embedded into the demo asset, the new watermark documenting that the second entity owns the modification so that ownership of the modification by the second entity is tracked in addition to ownership of the demo asset by the first entity as the demo asset is shared within the enterprise, wherein a watermark creation history is stored in a database.

2. The method of claim 1, wherein the controlling includes:

detecting, by the processor, the modifications to the demo asset by the second entity, as a function of the tracking;

determining, by the processor, that the modifications to the demo asset are a violation of the usage conditions and not allowed; and disabling, by the processor, the demo asset in response to the determining that the violation occurred so that the second entity cannot continue using the demo asset.

3. The method of claim 1, wherein the controlling includes:

notifying, by the processor, the first entity that the second entity has modified the demo asset.

4. The method of claim 1, wherein the usage conditions include: a period of usage, an authorized user requirement, and editing capabilities.

5. The method of claim 1, wherein the demo asset is a configuration of hardware and software for at least one of: a front end interface, including a dashboard, a webpage, and an application front end, and a backend application to handle business logic or acquire services, further wherein the demo asset is configured to access a database.

6. A computing system, comprising:

a processor;

a memory device coupled to the processor; and a computer readable storage device coupled to the processor, wherein the storage device contains program code executable by the processor via the memory device to implement a method for controlling usage of shared demo assets used within an enterprise comprising:

embedding, by the processor, a digital watermark into a demo asset created by a first entity of the enterprise, the digital watermark including first usage conditions automatically input by the processor using a learning algorithm that learns the preferences of the first entity over time, the first usage conditions governing multiple types of modifications that can be made to the demo asset by other entities of the enterprise;

generating, by processor, second usage conditions that are stricter than the first usage conditions that allow for less modifications by the other entities, based on the learning algorithm analyzing a frequency that the demo asset is borrowed by the other entities;

tracking, by the processor, modifications to the demo asset by a second entity by utilizing the digital watermark embedded into the demo asset; and controlling, by the processor, the modifications to the demo asset by the second entity based on a compliance with the second usage conditions updated by the learning algorithm, wherein the controlling includes:

determining, by the processor, that a modification to a content of the demo asset by the second entity is allowed under the second usage conditions, and creating, by the processor, a new watermark to be embedded into the demo asset that replaces a previous watermark embedded into the demo asset, the new watermark documenting that the second entity owns the modification so that ownership of the modification by the second entity is tracked in addition to ownership of the demo asset by the first entity as the demo asset is shared within the enterprise, wherein a watermark creation history is stored in a database.

7. The computing system of claim 6, wherein the controlling includes:

detecting, by the processor, the modifications to the demo asset by the second entity, as a function of the tracking;

determining, by the processor, that the modifications to the demo asset are a violation of the usage conditions and not allowed; and disabling, by the processor, the demo asset in response to the determining that the violation occurred so that the second entity cannot continue using the demo asset.

8. The computing system of claim 6, wherein the controlling includes:

notifying, by the processor, the first entity that the second entity has modified the demo asset.

9. The computing system of claim 6, wherein the usage conditions include: a period of usage, an authorized user requirement, and editing capabilities.

10. The computing system of claim 6, wherein the demo asset is a configuration of hardware and software for at least one of: a front end interface, including a dashboard, a webpage, and an application front end, and a backend application to handle business logic or acquire services, further wherein the demo asset is configured to access a database.

11. A computer program product, comprising a computer readable hardware storage device storing a computer readable program code, the computer readable program code comprising an algorithm that when executed by a computer processor of a computing system implements a method for controlling usage of shared demo assets used within an enterprise comprising:

embedding, by the processor, a digital watermark into a demo asset created by a first entity of the enterprise, the digital watermark including first usage conditions automatically input by the processor using a learning algorithm that learns the preferences of the first entity over time, the first usage conditions governing multiple types of modifications that can be made to the demo asset by other entities of the enterprise;

generating, by processor, second usage conditions that are stricter than the first usage conditions that allow for less modifications by the other entities, based on the learning algorithm analyzing a frequency that the demo asset is borrowed by the other entities;

tracking, by the processor, modifications to the demo asset by a second entity by utilizing the digital watermark embedded into the demo asset; and controlling, by the processor, the modifications to the demo asset by the second entity based on a compliance with the second usage conditions updated by the learning algorithm, wherein the controlling includes:

determining, by the processor, that a modification to a content of the demo asset by the second entity is allowed under the second usage conditions, and creating, by the processor, a new watermark to be embedded into the demo asset that replaces a previous watermark embedded into the demo asset, the new watermark documenting that the second entity owns the modification so that ownership of the modification by the second entity is tracked in addition to ownership of the demo asset by the first entity as the demo asset is shared within the enterprise, wherein a watermark creation history is stored in a database.

12. The computer program product of claim 11, wherein the controlling includes:
   detecting, by the processor, the modifications to the demo asset by the second entity, as a function of the tracking;
   determining, by the processor, that the modifications to the demo asset are a violation of the usage conditions and not allowed; and
   disabling, by the processor, the demo asset in response to the determining that the violation occurred so that the second entity cannot continue using the demo asset.

13. The computer program product of claim 11, wherein the usage conditions include: a period of usage, an authorized user requirement, and editing capabilities.

14. The computer program product of claim 11, wherein the demo asset is a configuration of hardware and software for at least one of: a front end interface, including a dashboard, a webpage, and an application front end, and a backend application to handle business logic or acquire services, further wherein the demo asset is configured to access a database.

* * * * *